(12) United States Patent
Graves et al.

(10) Patent No.: US 10,808,827 B2
(45) Date of Patent: Oct. 20, 2020

(54) SYSTEM AND METHOD FOR PRE-LOADING BEARINGS

(71) Applicant: Tesla, Inc., Palo Alto, CA (US)

(72) Inventors: Scott Michael Graves, Felton, CA (US); Luke Ottaway, Los Altos, CA (US); Ian Felder, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 56 days.

(21) Appl. No.: 15/944,851

(22) Filed: Apr. 4, 2018

(65) Prior Publication Data

US 2019/0003526 A1 Jan. 3, 2019

Related U.S. Application Data

(60) Provisional application No. 62/527,921, filed on Jun. 30, 2017.

(51) Int. Cl.
*F16H 57/04* (2010.01)
*H02K 7/116* (2006.01)
(Continued)

(52) U.S. Cl.
CPC .......... *F16H 57/0409* (2013.01); *B60K 1/00* (2013.01); *B60K 17/043* (2013.01); *F16C 25/083* (2013.01); *F16H 57/0402* (2013.01); *F16H 57/046* (2013.01); *F16H 57/0412* (2013.01); *F16H 57/0423* (2013.01); *F16H 57/0424* (2013.01); *F16H 57/0427* (2013.01); *F16H 57/0436* (2013.01); *F16H 57/0457* (2013.01); *F16H 57/0471* (2013.01); *F16H 57/0482* (2013.01); *F16H 57/0483* (2013.01);
(Continued)

(58) Field of Classification Search
CPC ............. F16H 57/0409; F16H 57/0412; F16H 57/0423; F16H 57/0471; F16C 25/083; H02K 7/003
See application file for complete search history.

(56) References Cited

U.S. PATENT DOCUMENTS 4,269,295 A * 5/1981 Kish ..................... F16D 35/022
192/58.684
4,607,180 A 8/1986 Stoody
(Continued)

FOREIGN PATENT DOCUMENTS

| CN | 203831276 | 9/2014 |
|---|---|---|
| GB | 162552 | 5/1921 |

(Continued)

*Primary Examiner* — Vicky A Johnson
(74) *Attorney, Agent, or Firm* — Knobbe, Martens, Olson & Bear, LLP (57) ABSTRACT

A drive unit is disclosed that includes case portions, a gasket interposed between the case portions, shafts, bearings having respective bearing races, and a bearing shim plate. One shaft includes an input oil tube which provides a fluid pathway between the bearing shim plate and a rotor of the drive unit. Interposed between bearings, and the bearing shim plate, are shims. An approach for sizing shims for use with a drive unit is also disclosed, the approach including determining the distance from a mating flange of a case portion, to different bearing races, selecting shims based on the determined distances, and attaching the bearing shim plate to the case portion with shims interposed therebetween.

20 Claims, 6 Drawing Sheets

(51) Int. Cl.
*B60K 1/00* (2006.01)
*B60K 17/04* (2006.01)
*F16C 25/08* (2006.01)
*H02K 7/00* (2006.01)
*H02K 7/04* (2006.01)
*H02K 7/08* (2006.01)
*H02K 15/16* (2006.01)
*H02K 1/20* (2006.01)
*H02K 9/193* (2006.01)
*F16H 57/032* (2012.01)
*F16H 57/02* (2012.01)
*F16H 57/037* (2012.01)
*H02K 9/19* (2006.01)
*B60K 1/02* (2006.01)

(52) U.S. Cl.
CPC ............... *H02K 1/20* (2013.01); *H02K 7/003* (2013.01); *H02K 7/04* (2013.01); *H02K 7/083* (2013.01); *H02K 7/116* (2013.01); *H02K 9/193* (2013.01); *H02K 15/165* (2013.01); *B60K 1/02* (2013.01); *B60K 17/04* (2013.01); *B60K 2001/001* (2013.01); *B60Y 2200/91* (2013.01); *B60Y 2306/03* (2013.01); *B60Y 2306/05* (2013.01); *B60Y 2410/1022* (2013.01); *F16C 2326/06* (2013.01); *F16H 57/037* (2013.01); *F16H 2057/02034* (2013.01); *F16H 2057/0325* (2013.01); *H02K 7/006* (2013.01); *H02K 9/19* (2013.01)

(56) References Cited

U.S. PATENT DOCUMENTS

| | | | |
|---|---|---|---|
| 5,251,725 A | 10/1993 | Barrett, Jr. | |
| 5,899,574 A * | 5/1999 | Chujo | F16C 25/083 384/518 |
| 6,123,338 A | 9/2000 | Edelmann | |
| 6,158,898 A * | 12/2000 | Jeng | F16C 25/083 384/518 |
| 6,507,134 B1 * | 1/2003 | Severien | F16C 27/04 310/90 |
| 6,938,731 B2 | 9/2005 | Slesinski | |
| 7,374,507 B2 | 5/2008 | Corless | |
| 9,052,009 B2 | 6/2015 | Barillot | |
| 9,810,311 B1 | 11/2017 | Zhang | |
| 9,822,869 B1 | 11/2017 | Carr | |
| 10,208,848 B2 | 2/2019 | Hotait | |
| 10,510,195 B2 | 12/2019 | Patil et al. | |
| 2004/0130224 A1 | 7/2004 | Magi | |
| 2004/0134693 A1 | 7/2004 | Yamagishi | |
| 2005/0045393 A1 | 3/2005 | Mizutani | |
| 2006/0062505 A1 * | 3/2006 | Hoefs | F16F 1/324 384/517 |
| 2009/0102298 A1 | 4/2009 | Savant | |
| 2009/0127954 A1 | 5/2009 | Mogi | |
| 2009/0212649 A1 | 8/2009 | Kingman | |
| 2010/0187954 A1 | 7/2010 | Kendall | |
| 2012/0096968 A1 | 4/2012 | Kawamoto | |
| 2013/0293040 A1 | 11/2013 | Chamberlin | |
| 2014/0027238 A1 * | 1/2014 | Schlaufman | F16D 13/42 192/70.23 |
| 2014/0056733 A1 | 2/2014 | Ojima | |
| 2014/0147306 A1 | 5/2014 | Yamashita | |
| 2014/0284183 A1 | 9/2014 | Wolters | |
| 2014/0364263 A1 | 12/2014 | Tokunaga | |
| 2015/0082929 A1 | 3/2015 | Lsomura | |
| 2016/0311306 A1 | 10/2016 | Sugiyama | |
| 2017/0096058 A1 | 4/2017 | Kanada | |
| 2018/0259060 A1 | 9/2018 | Poster | |
| 2018/0278126 A1 | 9/2018 | Goldstein | |
| 2019/0003526 A1 * | 1/2019 | Graves | F16H 57/0423 |
| 2019/0267869 A1 | 8/2019 | Soma | |

FOREIGN PATENT DOCUMENTS

| | | |
|---|---|---|
| GB | 1426352 | 2/1976 |
| WO | WO 16/04670 | 12/2016 |

* cited by examiner

SYSTEM AND METHOD FOR PRE-LOADING BEARINGS

CROSS-REFERENCE TO RELATED APPLICATION

The present U.S. Utility Patent Application claims priority pursuant to 35 U.S.C. § 119(e) to U.S. Provisional Application No. 62/527,921, entitled "ELECTRIC DRIVE UNIT", filed Jun. 30, 2017, which is hereby incorporated herein by reference in its entirety and made part of the present U.S. Utility Patent Application for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present disclosure relates to pre-loading bearings, and more particularly to pre-loading bearings using shims.

Description of Related Art

In the world of internal combustion engines, bearing noise and bearing drag are not typically of concern due to engine noise and system inefficiencies that mask such issues. In an electric drive unit used in an electric vehicle, however, bearing noise can greatly compromise the user experience, and bearing drag can negatively impact efficiency. With respect to a loss in efficiency, this translates to loss of vehicle range, or an increase in system weight and system cost system, for example, if one were to increase the number of batteries in an electric vehicle to achieve a desired range. Consideration must also be given to the design of parts for manufacturing and assembly purposes, bearing in mind variations in the size of cooperating components from one system to the next.

Accordingly, there is a need for an improved approach for pre-loading bearings.

SUMMARY

In order to overcome the shortcomings of the prior approached, a first embodiment of the present disclosure includes a method of selecting shims for use in an electric drive unit having a first bearing, a second bearing, a first gear shaft positioned within the first bearing and the second bearing, a first case portion holding the first bearing and defining a mating flange, a second case portion holding the second bearing, and a bearing shim plate. The first case portion attaches to the second case portion with a gasket interposed between the first case portion and the second case portion. The method includes determining a first distance from the mating flange of the first case portion to a first bearing race of the first bearing, selecting a first shim based on the first distance from the mating flange of the first case portion to the first bearing race of the first bearing to apply a first axial pre-load to the first bearing and the second bearing, and attaching the bearing shim plate to the first case portion with the first shim interposed between a bearing shim plate gasket and the first bearing race, with the bearing shim plate gasket interposed between the bearing shim plate and the first shim, and with the bearing shim plate gasket further interposed between the bearing shim plate and the first case portion.

A shim plate gasket thickness would normally be added in the shim size calculation and tolerance stack-up. However, according to the present disclosure, the shim plate gasket overlaps (is interposed with) the shim and it is not necessary to measure or control the shim plate gasket thickness to maintain shim sizing accuracy. Thus, selecting an appropriate shim may be performed independent of gasket thickness or gasket tolerance.

According to a first aspect of the first embodiment, the electric drive unit further includes a third bearing, a fourth bearing and a second gear shaft positioned within the third bearing and the fourth bearing, wherein the first case portion holds the third bearing, wherein the second case portion holds the fourth bearing. According to this first aspect, the method further includes determining a second distance from the mating flange of the first case portion to a third bearing race of the third bearing, selecting a second shim based on the second distance from the mating flange of the bearing shim plate to the third bearing race of the third bearing to apply a second axial pre-load to the third bearing and the fourth bearing, and attaching the bearing shim plate to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion.

According to a second aspect of the first embodiment, a first thickness of the first shim is different from a second thickness of the second shim. Further, both the first thickness of the first shim is within a tolerance and the second thickness of the second shim is within the tolerance. According to a third aspect of the first embodiment, the first gear shaft transfers the first axial pre-load applied to the first bearing to the second bearing.

According to a second embodiment of the present disclosure, an electric drive unit includes a first bearing, a second bearing, a first gear shaft positioned within the first bearing and the second bearing, a first case portion holding the first bearing and defining a mating flange, a second case portion holding the second bearing, a gasket, a bearing shim plate gasket, a first shim and a bearing shim place. The first shim is selected based on a first distance from the mating flange of the first case portion to a first bearing race of the first bearing to apply a first axial pre-load to the first bearing and the second bearing. The bearing shim plate attaches to the first case portion with the first shim interposed between the bearing shim plate gasket and the first bearing race, with the bearing shim plate gasket interposed between the bearing shim plate and the first shim, and with the bearing shim plate gasket further interposed between the bearing shim plate and the first case portion. The first case portion attaches to the second case portion with the gasket interposed between the first case portion and second case portion. The second embodiment has similar benefits as does the first embodiment in shim selection.

According to a first aspect of the second embodiment, the electric drive unit further includes a third bearing, a fourth bearing, and a second gear shaft positioned within the third bearing and the fourth bearing, and a second shim selected based on a second distance from the mating flange of the first case portion to a third bearing race of the third bearing to apply a second axial pre-load to the third bearing and the fourth bearing. With this first aspect, the first case portion holds the third bearing, the second case portion holds the fourth bearing, and the bearing shim plate is further attached to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion.

According to a second aspect of the second embodiment, a first thickness of the first shim is different from a second thickness of the second shim. Further, both the first thickness of the first shim is within a tolerance and the second thickness of the second shim is within the tolerance. According to a third aspect of the second embodiment, the first gear shaft transfers the first axial pre-load applied to the first bearing to the second bearing.

According to fourth aspect of the second embodiment, the first case portion may define a recess for accepting the first shim. Further, the first gear shaft may transfer the first axial pre-load applied to the first bearing to the second bearing.

According to a third embodiment of the present disclosure, an electric drive unit includes a first bearing having a first bearing race, a second bearing, a third bearing having a third bearing race, a fourth bearing, a first gear shaft positioned within the first bearing and the second bearing, a second gear shaft positioned within the third bearing and the fourth bearing, a first case portion holding the first bearing and the third bearing, and defining a mating flange, a second case portion holding the third bearing and the fourth bearing, a gasket, a bearing shim plate gasket, a first shim, a second shim, a bearing shim plate. The bearing shim plate is attached to the first case portion with the first shim interposed between the bearing shim plate gasket and the first bearing race, with the bearing shim plate gasket interposed between the bearing shim plate and the first shim, and with the bearing shim plate gasket further interposed between the bearing shim plate and the first case portion. Further, the bearing shim plate is attached to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion. Further, the first case portion is attached to the second case portion with the gasket interposed between the first case portion and second case portion, the first shim applies a first axial pre-load to the first bearing and the second bearing, and the second shim applies a second axial pre-load to the third bearing and the fourth bearing.

According to a first aspect of the third embodiment, a first thickness of the first shim is different from a second thickness of the second shim. According to a second aspect of the third embodiment, the first thickness of the first shim is within a tolerance, and wherein the second thickness of the second shim is within the tolerance. Further, according to a third aspect of the third embodiment, the first gear shaft transfers the first axial pre-load applied to the first bearing to the second bearing.

According to an aspect of all the first, second, and third embodiments, the first shim may be selected from a plurality of shims of varying thicknesses. Further, the thicknesses vary in defined intervals.

DETAILED DESCRIPTION OF THE DISCLOSURE

Figure 1A:
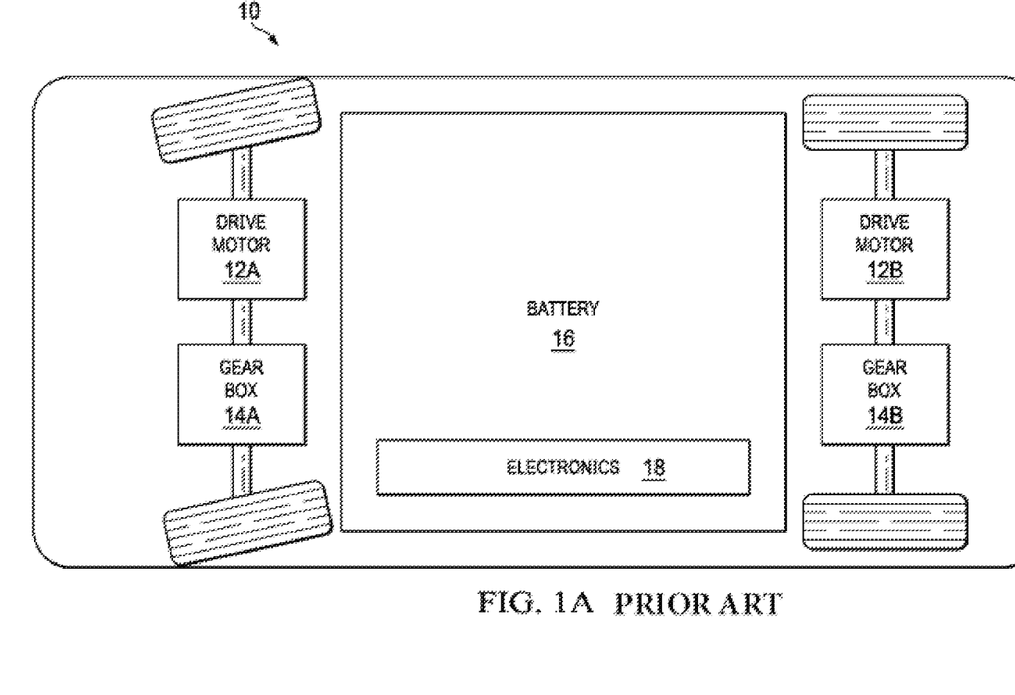
FIG. 1A illustrates the basic components of a battery powered electric vehicle.

FIG. 1A illustrates the basic components of a battery powered electric vehicle (electric vehicle) 10. The electric vehicle 10 includes at least one drive motor (traction motor) 12A and/or 12B, at least one gear box 14A and/or 14B coupled to a corresponding drive motor 12A and/or 12B, a battery 16 and electronics 18 (including drive motor electronics). Generally, the battery 16 provides electricity to the electronics 18 of the electric vehicle 10 and to propel the electric vehicle 10 using the drive motor 12A and/or 12B. The electric vehicle 10 includes a large number of other components that are not described herein but known to one or ordinary skill. While the construct of the electric vehicle 10 of FIG. 1A is shown to have four wheels, differing electric vehicles may have fewer or more than four wheels. Further, differing types of electric vehicles 10 may incorporate the inventive concepts described herein, including motor cycles, aircraft, trucks, boats, train engines, among other types of vehicles.

Various operational issues with the electric vehicle 10 are described herein in conjunction with various embodiments. One of these operational issues relates to the pre-loading of bearings in gear box 14A or 14B. Subsequent description herein may relate back to the components of this FIG. 1A. Common numbering may be used to refer to components identified in further FIGs. described herein.

Figure 1B:
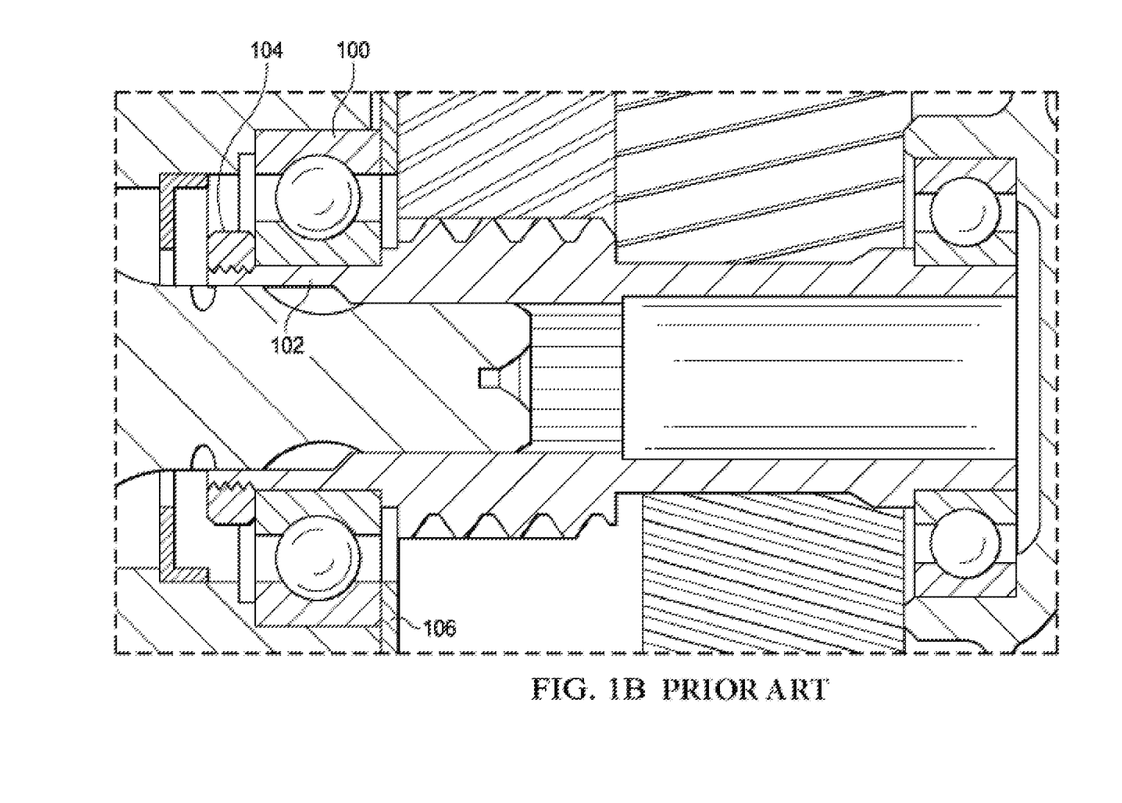
FIG. 1B shows a side sectional view of a bearing secured by a locknut.

FIG. 1B shows a prior approach to securing bearings. Specifically, FIG. 1B shows bearing 100 situated around shaft 102 and secured with threaded locknut 104 on one side and retainer plate 106 on another, which together ensure bearing 100 and shaft 102 do not move in an axial direction. This arrangement does not, however, provide any axial pre-loading to bearing 100.

Figure 2:
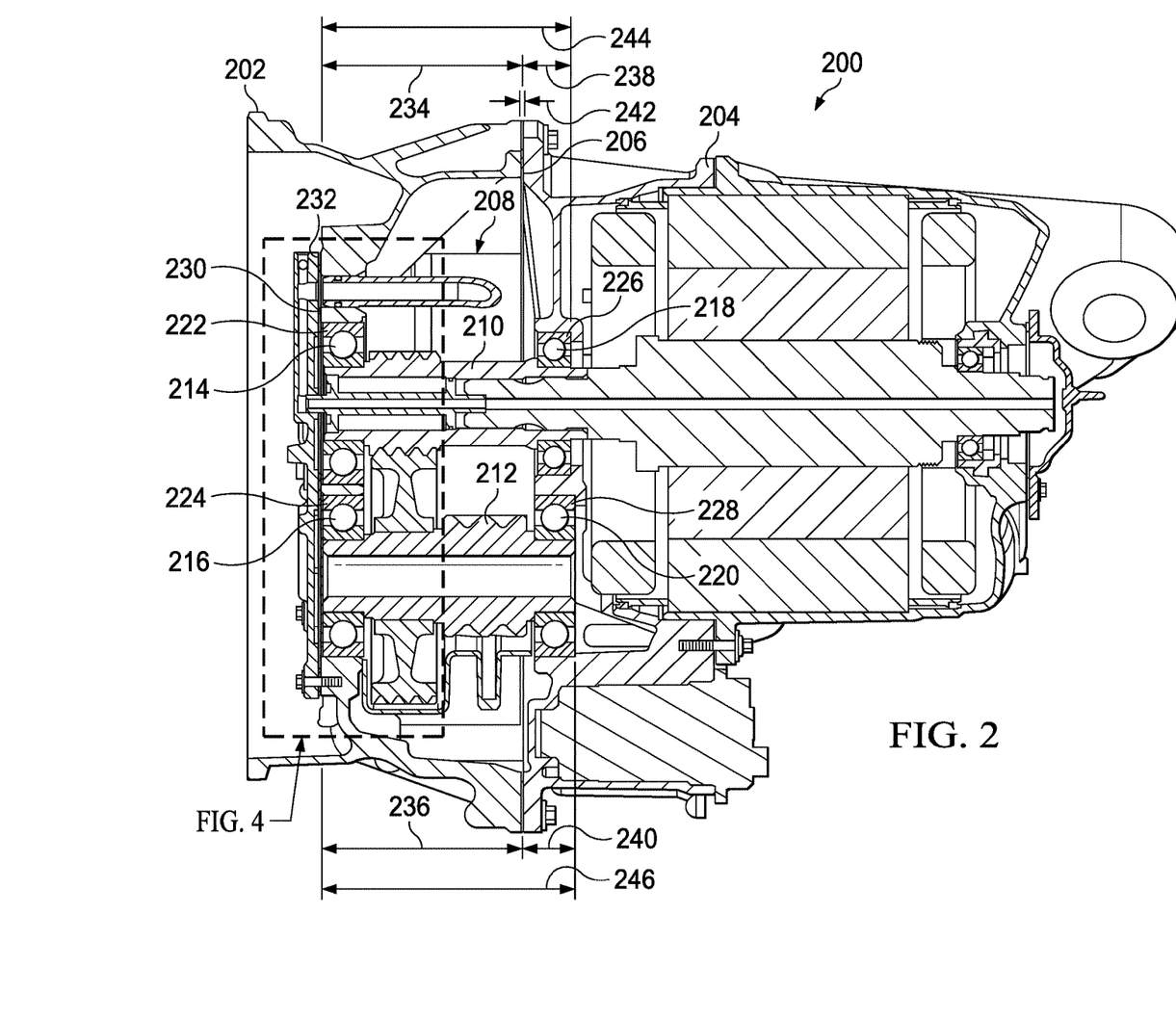
FIG. 2 shows a side sectional view of an electric drive unit according to a disclosed embodiment.
Figure 3A:
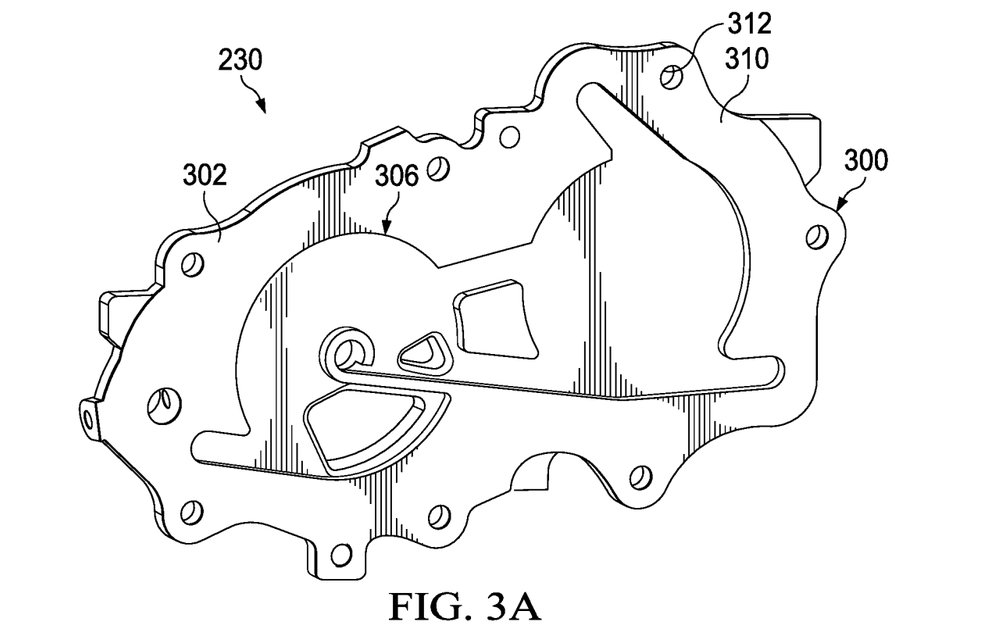
FIGS. 3A and 3B illustrate front and rear perspective views respectively of a bearing shim plate according to a disclosed embodiment.
Figure 3B:
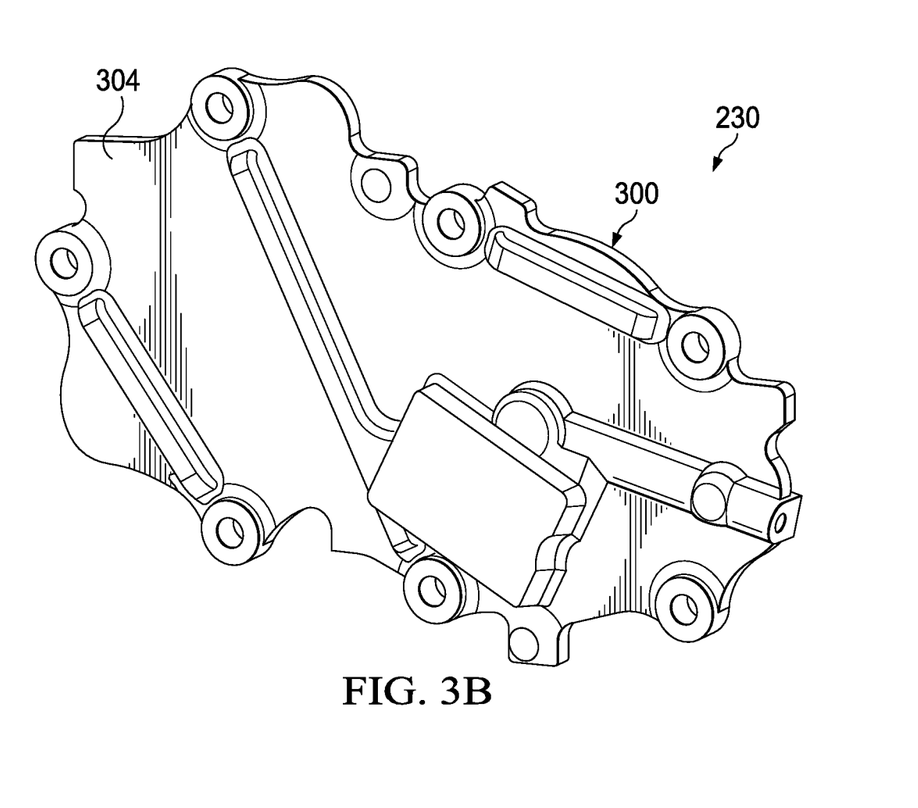
Figure 4:
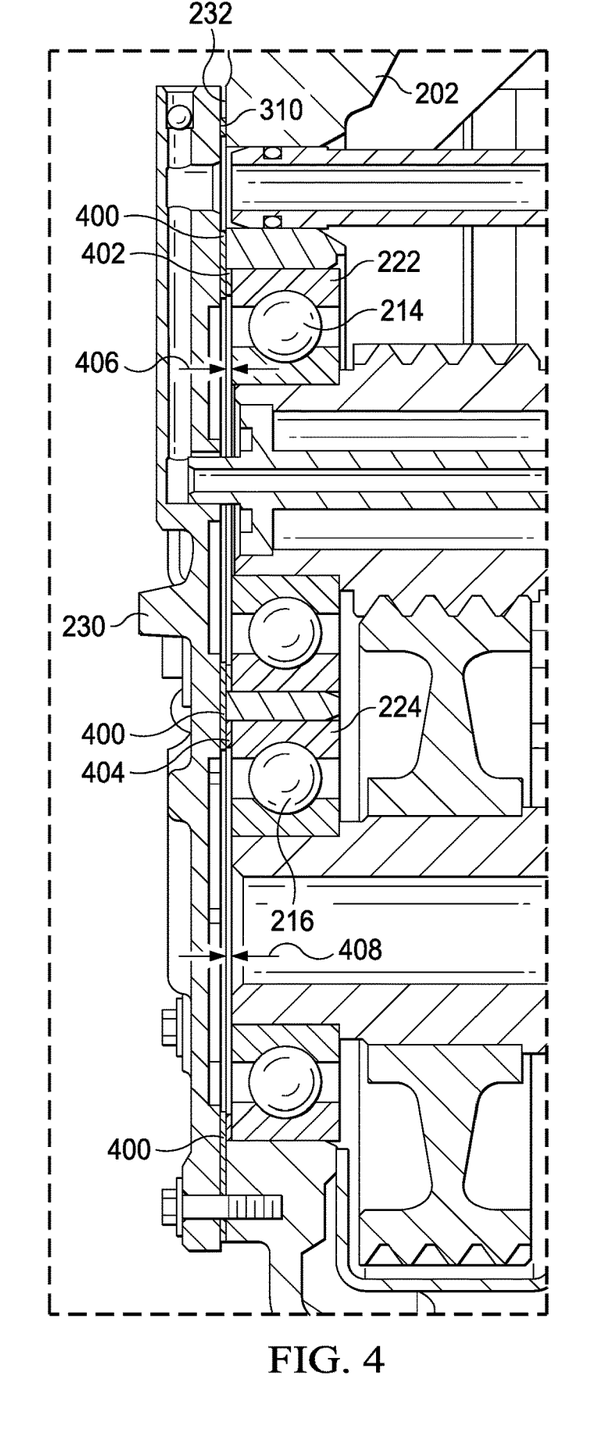
FIG. 4 shows a side sectional view of a bearing shim plate according to a disclosed embodiment.

FIG. 2 shows a side sectional view of an electric drive unit according to a disclosed embodiment which, together with FIGS. 3A, 3B and 4, will be used to describe an improved approach for shimming bearings. As shown therein, drive unit 200 (which could include drive motor 12A or 12B and gear box 14A or 14B of FIG. 1A) includes first case portion 202, second case portion 204, optional gasket 206 interposed between case portions 202 and 204, which collectively define gear box cavity 208. Drive unit 200 further includes first gear shaft 210, second gear shaft 212, first bearing 214, second bearing 218, third bearing 216 and fourth bearing 220, having first bearing race 222, second bearing race 226, third bearing race 224 and fourth bearing race 228, respectively. Also shown is bearing shim plate 230 and mating flange 232 defined by first case portion 202.

FIGS. 3A and 3B illustrate inner side and outer side perspective views respectively of bearing shim plate 230 according to a disclosed embodiment. As shown therein bearing shim plate 230 includes body 300 which defines inner side 302, outer side 304, and cavity 306 extending into body 300 from inner side 302. Inner side 302 also defines a mating flange 310 having attachment holes 312 defined therein.

FIG. 4 shows a side sectional view of bearing shim plate 230 according to a disclosed embodiment. As shown therein bearing shim plate gasket 400 is interposed between mating flange 310 of bearing shim plate 230, and mating flange 232 of first case portion 202. Though shown as one gasket herein, a person of skill in the art will appreciate multiple gaskets could alternatively be used, for example in a side by side arrangement. Also shown in FIG. 4, are first shim 402 and second shim 404, adjacent mating flange 232 of first case portion 202, and interposed between bearing shim plate gasket 400 and first bearing 214 and third bearing 216, respectively (and more specifically the outer bearing races thereof—i.e. first bearing race 222, and third bearing race 224, respectively).

One benefit of using shims is that they can reduce bearing noise and vibration. Shimming may also better align gears which can be highly sensitive to alignment issues, which in turn may reduce gear noise. Too much axial pre-loading, however, can negatively impact gearbox efficiency by increasing gearbox drag. Accordingly, it is important to select a shim whose size is as close as possible to a determined size for achieving a desired amount of axial pre-loading.

Referring back to FIG. 2, in prior approaches for selecting shims for use in electric drive units, several measurements were needed. These measurements included the following: bearing bore depth 234 and bearing bore depth 236 of first case portion 202; bearing bore depth 238 and bearing bore depth 240 of second case portion 204; the thickness 242 of gasket 206 (if applicable); shaft height 244 of first gear shaft 210 from first bearing 214 to second bearing 218; and shaft height 246 of second gear shaft 212 from third bearing 216 to fourth bearing 220. As a result, the shimming process was time consuming, and there were many opportunities for measurement and calculation errors to be introduced.

According to a disclosed embodiment, shims may be used to consistently pre-load input and intermediate bearings as precisely as possible, and regardless of the axial tolerance stack up of the aforementioned parts. More specifically, by using bearing shim plate 230 with a wide range of shims of varying thicknesses at defined intervals, and within an acceptable tolerance, one may size an appropriate shim with fewer measurements than before. This greatly simplifies the manufacturing process and improves shim accuracy by reducing measurement and calculation errors. Specifically, the measurements may include a first distance from mating flange 232 to first bearing 214, and a second distance from mating flange 232 to third bearing 216, and more specifically to first bearing race 222 and third bearing race 224, thereof. According to a described embodiment, the respective bores holding the bearings are designed to have a depth greater than the width of an associated bearing, such than when bearings are inserted therein, recesses into which the shims may sit are formed, which recesses aid in the assembly process. By knowing this depth and selecting a shim having a greater thickness, the amount of pre-loading that will be applied, when bearing shim plate 230 is secured such that its mating flange 310 is flush with mating flange 232 of first case portion 202, becomes a function of the amount the thickness of the respective shim exceeds the measured depth. As shown in FIG. 4, first shim 402 has a first thickness 406 and second shim 404 has a second thickness 408, which respectively apply a first axial pre-load and a second axial pre-load to first bearing 214 and third bearing 216, respectively. The first axial pre-load and the second axial pre-load may be the same or different.

While FIGS. 2-4 are shown in the context of using bearing shim plate 230, one of skill in the art will appreciate that if the drive unit in question had one only bearing to be shimmed, a bearing shim plate having a different configuration could be used. Alternatively, if first bearing 214 and third bearing 216 were not in substantially the same plane, but rather staggered for example, a bearing shim plate having a tiered, or stepped, mating surface could be used so as to shim multiple bearing using a single bearing shim plate.

Figure 5:
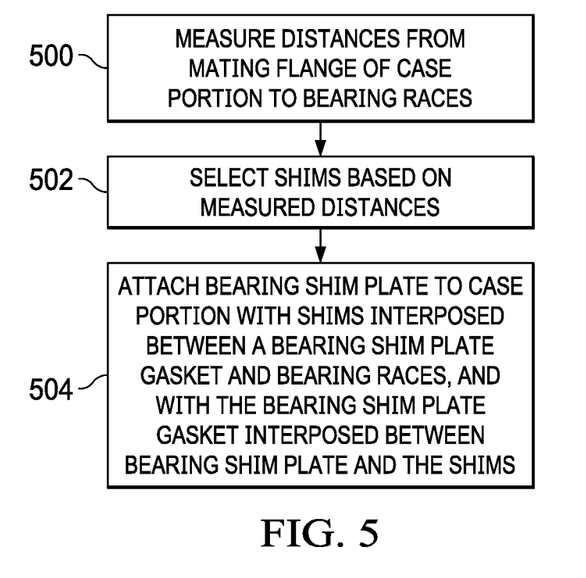
FIG. 5 illustrates an approach for sizing shims for use with an electric drive unit according to a disclosed embodiment.

FIG. 5 illustrates an approach for sizing shims for use with an electric drive unit according to a disclosed embodiment, which method can use the structure and apparatus disclosed above with respect to FIGS. 1-4. A first step 500 is to measure the distances from the mating flange of the first case portion, to the first bearing race and to the third bearing race are measured. A second step 502 is to select shims based on the determined distances from the mating flange to the respective bearing races of the bearings being shimmed. Finally, a third step 504 is to attach and secure the bearing shim plate to the first case portion 202, with shims and interposed between the bearing shim plate gasket and the bearing races of the bearings being shimmed, and with bearing shim plate gasket interposed between the bearing shim plate and the shims. Note, the shims need not be of the same thickness, but could be. A shim plate gasket thickness would normally be added in the shim size calculation and tolerance stack-up. However, according to the present disclosure, the shim plate gasket overlaps (is interposed with) the shim and it is not necessary to measure or control the shim plate gasket thickness to maintain shim sizing accuracy.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method of selecting shims for use in an electric drive unit comprising a first bearing, a second bearing, a first gear shaft positioned within the first bearing and the second bearing, a first case portion holding the first bearing and defining a mating flange, a second case portion holding the second bearing, and a bearing shim plate, wherein the first case portion is attached to the second case portion with a gasket interposed between the first case portion and the second case portion, the method comprising:
   determining a first distance from the mating flange of the first case portion to a first bearing race of the first bearing;
   selecting a first shim based on the first distance from the mating flange of the first case portion to the first bearing race of the first bearing to apply a first axial pre-load to the first bearing and the second bearing; and
   attaching the bearing shim plate to the first case portion with the first shim interposed between a bearing shim plate gasket and the first bearing race, with the bearing shim plate gasket interposed between the bearing shim plate and the first shim, and with the bearing shim plate gasket further interposed between the bearing shim plate and the first case portion.

2. The method of selecting shims of claim 1, wherein the electric drive unit further comprises a third bearing, a fourth bearing and a second gear shaft positioned within the third bearing and the fourth bearing, wherein the first case portion holds the third bearing, wherein the second case portion holds the fourth bearing, the method further comprising:
   determining a second distance from the mating flange of the first case portion to a third bearing race of the third bearing;
   selecting a second shim based on the second distance from the mating flange of the bearing shim plate to the third bearing race of the third bearing to apply a second axial pre-load to the third bearing and the fourth bearing; and
   attaching the bearing shim plate to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion.

3. The method of selecting shims of claim 2, wherein a first thickness of the first shim is different from a second thickness of the second shim.

4. The method of selecting shims of claim 3, wherein the first thickness of the first shim is within a tolerance, and wherein the second thickness of the second shim is within the tolerance.

5. The method of selecting shims of claim 1, wherein the first gear shaft transfers the first axial pre-load applied to the first bearing to the second bearing.

6. The method of selecting shims of claim 1, wherein the first shim is selected from a plurality of shims of varying thicknesses.

7. The method of selecting shims of claim 6, wherein the thicknesses vary in defined intervals.

8. An electric drive unit comprising:
   a first bearing;
   a second bearing;
   a first gear shaft positioned within the first bearing and the second bearing;
   a first case portion holding the first bearing and defining a mating flange;
   a second case portion holding the second bearing;
   a gasket;
   a bearing shim plate gasket;
   a first shim selected based on a first distance from the mating flange of the first case portion to a first bearing race of the first bearing to apply a first axial pre-load to the first bearing and the second bearing; and
   a bearing shim plate attached to the first case portion with the first shim interposed between the bearing shim plate gasket and the first bearing race, with the bearing shim plate gasket interposed between the bearing shim plate and the first shim, and with the bearing shim plate gasket further interposed between the bearing shim plate and the first case portion;
   wherein the first case portion is attached to the second case portion holding the second bearing with the gasket interposed between the first case portion and the second case portion holding the second bearing.

9. The electric drive unit of claim 8, wherein the electric drive unit further comprises a third bearing, a fourth bearing, and a second gear shaft positioned within the third bearing and the fourth bearing, and a second shim selected based on a second distance from the mating flange of the first case portion to a third bearing race of the third bearing to apply a second axial pre-load to the third bearing and the fourth bearing, wherein the first case portion holds the third bearing, wherein the second case portion holds the fourth bearing, and wherein the bearing shim plate is further attached to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion.

10. The electric drive unit of claim 9, wherein a first thickness of the first shim is different from a second thickness of the second shim.

11. The electric drive unit of claim 10, wherein the first thickness of the first shim is within a tolerance, and wherein the second thickness of the second shim is within the tolerance.

12. The electric drive unit of claim 8, wherein the first case portion defines a recess for accepting the first shim.

13. The electric drive unit of claim 8, wherein the first gear shaft transfers the first axial preload applied to the first bearing to the second bearing.

14. The electric drive unit of claim 13, wherein the first shim is selected from a plurality of shims of varying thicknesses and wherein the thicknesses vary in defined intervals.

15. An electric drive unit comprising:
   a first bearing having a first bearing race;

a second bearing;
a third bearing having a third bearing race;
a fourth bearing;
a first gear shaft positioned within the first bearing and the second bearing;
a second gear shaft positioned within the third bearing and the fourth bearing;
a first case portion holding the first bearing and the third bearing, and defining a mating flange;
a second case portion holding the third bearing and the fourth bearing;
a gasket;
a bearing shim plate gasket;
a first shim;
a second shim;
a bearing shim plate:
attached to the first case portion with the first shim interposed between the bearing shim plate gasket and the first bearing race, with the bearing shim plate gasket interposed between the bearing shim plate and the first shim, and with the bearing shim plate gasket further interposed between the bearing shim plate and the first case portion; and
attached to the first case portion with the second shim interposed between the bearing shim plate gasket and the third bearing race, with the bearing shim plate gasket interposed between the bearing shim plate and the second shim, and with the bearing shim plate gasket further interposed between the bearing shim plate and the first case portion;
wherein the first case portion is attached to the second case portion holding the third bearing and the fourth bearing with the gasket interposed between the first case portion and the second case portion holding the third bearing and the fourth bearing;
wherein the first shim applies a first axial pre-load to the first bearing and the second bearing; and
wherein the second shim applies a second axial pre-load to the third bearing and the fourth bearing.

16. The electric drive unit of claim 15, wherein a first thickness of the first shim is different from a second thickness of the second shim.

17. The electric drive unit of claim 16, wherein the first thickness of the first shim is within a tolerance, and wherein the second thickness of the second shim is within the tolerance.

18. The electric drive unit of claim 15, wherein the first gear shaft transfers the first axial preload applied to the first bearing to the second bearing.

19. The electric drive unit of claim 15, wherein the first shim is selected from a plurality of shims of varying thicknesses.

20. The electric drive unit of claim 19, wherein the thicknesses vary in defined intervals.

* * * * *